June 27, 1967 T. F. SINCOCK 3,328,196
PROCESS FOR COATING POLYSTYRENE ARTICLES WITH VINYLIDENE
CHLORIDE COPOLYMERS AND THE RESULTANT ARTICLE
Filed Nov. 5, 1963
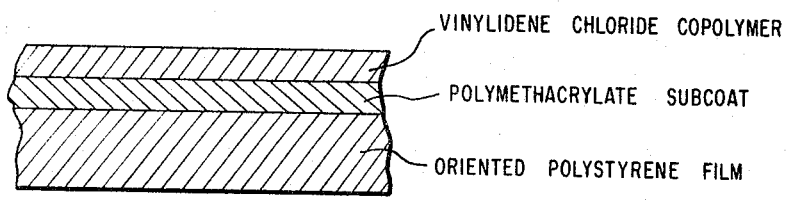
INVENTOR.
THOMAS F. SINCOCK
BY
Burns, Doane, Benedict,
Swecker and Mathis
ATTORNEYS

United States Patent Office 3,328,196
Patented June 27, 1967

3,328,196
PROCESS FOR COATING POLYSTYRENE ARTICLES WITH VINYLIDENE CHLORIDE COPOLYMERS AND THE RESULTANT ARTICLE
Thomas F. Sincock, Simsbury, Conn., assignor to Monsanto Company, St. Louis, Mo., a corporation of Delaware
Filed Nov. 5, 1963, Ser. No. 321,527
10 Claims. (Cl. 117—76)

This invention relates to an improvement in the art of coating polystyrene articles such as oriented polystyrene film or sheet with vinylidene chloride copolymer latices. More particularly the invention relates to the use of an aliphatic solvent soluble methacrylic ester resin as an anchoring coat for the vinylidene chloride copolymer latex.

Resinous copolymers of vinylidene chloride, commonly known under the generic name of saran, exhibit several important physical properties which make them desirable as coatings. Outstanding among these is their very low permeability to water and to gases such as oxygen, nitrogen, carbon dioxide and water vapor. In addition, the saran copolymers are usually clear, hard and block resistant. Consequently, the value of these resins or high molecular weight polymers has long been recognized in upgrading the properties of other materials especially in the packaging art. However, the use of saran copolymers is complicated by the need for an anchoring coat since saran copolymers generally show poor adhesion to plastic surfaces, sheets or films. In this respect, the coating of biaxially oriented polystyrene sheet or film has presented particular difficulties in that anchoring coats found satisfactory for cellulosic films or films made of other oxygen-containing materials such as polyethylene terephthalate and of relatively soft hydrocarbon polymers such as polyethylene, have been found inadequate in providing a good anchor for the vinylidene chloride copolymers on crisp and relatively hard hydrocarbon polymers such as oriented polystyrene.

It is an object of this invention to enhance the adhesion of saran to the surfaces of biaxially oriented polystyrene sheet or film by the prior application to the polystyrene surface of a resin subcoat in an inert aliphatic solvent. It is another object of this invention to provide an improved process of forming sheet-like packaging material comprising a base of biaxially oriented polystyrene having a vinylidene chloride copolymer coat firmly adhered thereto by means of an intermediate anchoring coating consisting essentially of a resinous alkyl methacrylate polymer or copolymer which is soluble in an aliphatic solvent. Still more particularly it is an object of this invention to provide a process wherein the anchoring resin may be applied simply, with a minimum of specialized equipment and at a rate which makes its use economical. These and other objects, as well as the nature and scope of the invention as well as its method of operation and use will become more clearly apparent from the following description.

It has now been discovered that a very superior coated packaging film or sheet is obtained when saran latex is applied as a top coating to biaxially oriented polystyrene film bearing an anchoring coating obtained by application of a solution of a non-tacky methacrylic ester resin such as polyisobutyl methacrylate in an aliphatic solvent such as heptane, and evaporation of the solvent.

The saran copolymer forming the top coating or layer in the present invention is a hard copolymer of at least about 80% to about 97% by weight of vinylidene chloride and correspondingly about 20% to about 3% of at least one other copolymerizable mono-olefinic monomer, as is otherwise well known in the art. For instance, particularly useful are well-known commercial copolymers of vinylidene chloride and a monomer selected from the group consisting of: alkyl acrylates or methacrylates having 1 to 8 carbon atoms per alkyl group, e.g., methyl, ethyl, or isobutyl acrylate or methacrylate, hexyl acrylate, octyl methacrylate; acrylonitrile or methacrylonitrile; vinyl chloride or vinyl acetate; and mixtures of the foregoing. Small amounts of an unsaturated aliphatic acid, e.g., 1% to 3% (based on total monomers) of acrylic, methacrylic or itaconic acid may also be included in the polymerizable mixture, as described, for instance, in U.S. Patent No. 2,829,069 to Michel.

The saran or vinylidene chloride copolymers are commonly obtained by emulsion polymerization and are commercially available in latex form, usually containing about 50% to 70% copolymer dispersed in water, or in the form of film suitable for lamination. Saran film suitable for lamination may be about 0.2 to 2 mils thick, 0.5 to 1 mil gauge being preferred for this purpose. The saran latices are commercially available under various tradenames, "Resyn 3600–C" made by National Starch and Chemical Company and "Daran 202" made by W. R. Grace & Company being representative. Generally speaking, the effectiveness of the vinylidene chloride copolymer as a barrier to water vapor transmission increases with the vinylidene chloride content of the copolymer so that high vinylidene chloride content permits the use of less coating material for equal barrier protection, except that 100% vinylidene chloride homopolymers are not useful because they do not have adequate film-forming properties.

The use of film-forming saran copolymers as high-barrier coatings for certain substrates such as paper or plastic sheets made of polyester or polyethylene is broadly old, but a similar use has not been found heretofore practical in connection with polystyrene film because of exceptionally difficult adhesion problems which it has not been possible to solve by conventional means. The present invention accordingly relates to a particular improvement in anchoring the known saran copolymers to biaxially oriented polystyrene film.

In the absence of a specific indication to the contrary, the terms "film" or "pellicle" are used herein to refer both to sheet material having a thickness of 3 mils or more and to thinner films. It should also be understood that all proportions and percentages of materials are expressed herein on a weight basis unless indicated otherwise.

More particularly it has now been found that the composition of the anchoring coating as well as the form in which it is applied are of decisive importance in the production of firmly adherent vinylidene chloride copolymer coatings on biaxially oriented polystyrene film. Polystyrene film is a very desirable packaging material because of its crispness, gloss, clarity and low cost. However, its high degree of smoothness, solubility in many common solvents and its hydrophobic nature also make it a very difficult material to which to adhere coatings necessary to impart additional desired properties such as impermeability.

The anchoring coating composition found to be especially suitable for use in this invention is a non-tacky, hard polymethacrylate type resin which is soluble in and accordingly applied from an aliphatic solvent such as hexane, heptane, low solvency (non-aromatic) naphtha or from blends thereof with an oxygenated solvent, e.g., a liquid alkanol such as isopropyl or isobutyl alcohol. More specifically, the resin used as the subcoating is prepared by polymerizing a $C_1$ to $C_4$ alkyl methacrylate, e.g., methyl methacrylate, propyl methacrylate or isobutyl methacrylate. n-Butyl methacrylate alone does not give a sufficiently hard polymer but can be used in minor amounts in admixture with the other methacrylates to give a suitable copolymer. Any of the well-known polymerization methods (solution, suspension, emulsion or bulk polymerization) can be used to make the hard, soluble polymers suitable for use in this invention. A particularly suitable polyisobutyl methacrylate material is available commercially under the trade name "Lucite 45" (Du Pont). Another suitable commercial material is a copolymer known commercially as Acryloid B-67, and consisting of about 95% combined isobutyl methacrylate and about 5% combined n-butyl methacrylate.

The accompanying drawing illustrates the novel composite film or sheet of this invention, showing and identifying by legends the oriented polystyrene base film, the alkyl methacrylate polymer anchoring coat and the vinylidene chloride copolymer top layer.

The invention is further illustrated by the following examples.

*Example 1*

A solution of aliphatic soluble methacrylic polymer obtained by copolymerizing 95% isobutyl methacrylate and 5% n-butyl methacrylate was applied at 5% solids from heptane using a #6 Mayer rod to clear, biaxially oriented polystyrene film of 1 mil (.001") thickness. The coating was dried by a ten second blast of compressed air at room (75° F.) temperature. For the top coating a commercial saran latex known as Daran 202 and having a solids content of 60% was used. The saran solids of this latex were composed of 90% vinylidene chloride copolymerized with about 2% acrylonitrile and about 8% ethyl methacrylate. This latex was applied to the subcoated polystyrene with a #6 Mayer rod and allowed to dry sixty seconds in a 195° F. forced hot air oven. The resultant hard coating was tested for adhesion by pressing a cellophane pressure sensitive tape strip across the boundary between coated and uncoated film and removing it with a single, rapid pull. Controls having no anchor coat allowed the vinylidene chloride copolymer latex to be 100% removed, while the anchored coating was satisfactory, less than 10% being pulled off in this severe test.

*Example 2*

Several hundred feet of anchored vinylidene chloride copolymer coated, biaxially oriented polystyrene film of 1 mil thickness were prepared similarly as in Example 1, except that pilot-scale application, doctoring and drying equipment was used. The copolymer latex was applied to produce a dry film thickness of 0.00025" upon drying in a combination of infrared and forced hot air ovens at about 190° F. The adhesion of this saran coating to the polystyrene base was equally as good as that reported in Example 1. The permeability properties of the resultant film and of a comparable uncoated polystyrene film are summarized below.

| Property | Anchored VCl$_2$-Copolymer Coated .001" Polystyrene | Uncoated Control .001" Polystyrene |
|---|---|---|
| Water Vapor Transmission Rate [1] | 0.6-1.0 | 8-10 |
| Oxygen Transmission Rate [2] | 2-3 | 200 |

[1] Gm./100 in$^2$/24 hr. at 90-95% relative humidity differential and 100° F.
[2] Cc./100 in$^2$/24 hr./atm.

This material yielded a heat seal strength of 328 grams per inch when sealed coated face to coated face at 250° F., 2-second dwell and 20 p.s.i. pressure. A saran coated film not having an anchoring coat gave erratic seals upon heat sealing in that the coating peeled from the substrate under shear.

*Example 3*

Example 2 is repeated except that the aliphatic soluble methacrylic resin is "Acryloid B-67," manufactured by Rohm & Haas Company, Philadelphia, Pa., and the vinylidene chloride copolymer latex is 60% solids dispersion of a commmercial resin composed of 90% vinylidene chloride copolymerized with 10% ethyl acrylate. Similarly satisfactory results are obtained as in Example 2.

| Property | Anchored VCl$_2$ Coated .001" Polystyrene | Uncoated Control |
|---|---|---|
| Water Vapor Transmission Rate [1] | 1.0 | 8-10 |
| Oxygen Transmission Rate [2] | 1.5 | 200 |
| Heat Seal Strength, gm./inch | [3] 266 | [4] 162 |

[1] Gm./100 in$^2$/24 hr. at 90-95% relative humidity differential and 100° F.
[2] Cc./100 in$^2$/24 hr./atm.
[3] Heat seal was made by pressing two pieces of the coated film face to face at 250° F., 2-second dwell and 20 p.s.i. pressure.
[4] This seal was made as in case of coated film except that sealing temperature of 245° F. was used; uncoated oriented polystyrene film unmolds when attempt is made to seal it at 250° F. in absence of surface coating.

*Example 4*

Example 2 is repeated once more except that "Daran 202" latex is used to provide the saran top coating. Again satisfactory adhesion and barrier properties are obtained.

*Example 5*

Example 2 is repeated still another time except that in this case the saran top coat is applied by laminating a 0.0005" thick saran film on the subcoated polystyrene base. The properties of the resulting product are similarly good as in Example 2.

*Example 6*

10 parts by weight of polyisobutyl methacrylate in solid bead form ("Lucite 45") was dissolved in 20 parts by weight of isobuntanol and the resulting solution was diluted with 180 parts by weight of heptane to produce a 5% solution. The solvent system thus contained 90% heptane and 10% isobuntanol by weight.

A similar coating solution was prepared from "Acryloid B-67" methacrylate copolymer, which is commercially available as 45% solids in VM & P naphtha. This solvent is a petroleum fraction falling between gasoline and mineral spirits, and having a distillation range between 205-375° F. This commercial concentrate was diluted with heptane to give a 5% by weight solution. The composition of the resultant solvent system was 94% heptane and 6% VM & P naphtha by weight.

Rolls of "Polyflex" biaxially oriented polystyrene sheet 0.0075 inch thick were subcoated with these two anchoring materials on a pilot coater by applying an excess of solution to one surface with a rotating applicator roll, doctoring the excess liquid with a rotating #3 Mayer rod, and heating the web in the last zone on the machine in hot air at 190° F.

The thus subcoated polystyrene sheet was coated with the saran copolymer emulsion described in Example 1, using a #6 Mayer rod. The individual samples were dried in an oven at 190° F. using two drying cycles of 30 seconds each.

A comparison of adhesion of the coating to the two subcoats, tabulated in Table 1, indicates that the Lucite 45 subcoated polystyrene sheet was somewhat superior to the Acryloid B-67 subcoated sheet but both products were acceptable.

TABLE 1.—POLYSTYRENE COATED WITH VINYLIDENE CHLORIDE COPOLYMER

| Test | B-67 Subcoat | L-45 Subcoat |
|---|---|---|
| Coating removal,[1] 96 hrs. water immersion | None | None |
| Tape test, initial [2] | 25% | 0 |
| Tape test, after tray forming [2] | 25%+ | 0 |
| Block | None | None |

[1] Tested by scrubbing the coated sheet after immersion in water.
[2] Approximate percent of coating removed by "Scotch" cellulose adhesive tape.

*Related prior art*

In this run a polymer of 2-ethylhexyl acrylate was prepared by conventional emulsion polymerization. The resulting latex was coagulated with concentrated HCl, the coagulated polymer was washed with distilled water and then dried. The 2-ethylhexyl acrylate polymer was applied from 90/10 heptane/isopropanol solution as a 5% solids solution to biaxially oriented polystyrene sheet (5 mil thick), using a #6 Mayer rod to give a dry subcoat thickness of 75 to 100 micrograms per square inch when dried in an oven at 190° F. The coating was clear and showed good adhesion to the polystyrene sheet but was very tacky. Vinylidene chloride copolymer latex of the kind described in Example 1 was applied to this coating with a #10 Mayer rod to give a dry top coat of 0.3 mil, dried and tested for adhesion by the Scotch tape test. This test showed comparable adhesion to that obtained in Example 3. However, the inherent tackiness of the acrylate polymer precludes its use as a subcoat when the sheet or film requires rewinding before application of the top coat, as is usually the case.

In another run a latex consisting of 70% 2-ethylhexyl acrylate and 30% vinylidene chloride with 1% itaconic acid was prepared as outlined in U.S. Patent No. 2,829,069. The latex would not wet untreated biaxially oriented polystyrene film. In order to obtain data, the latex was applied to corona treated film, which it did wet, and dried at 190° F. However, the coating again was extremely tacky and blocked severely. Commercial vinylidene chloride copolymers applied to this coating showed less adhesion than to the polymethacrylate subcoats used in Examples 1–6.

The same acrylate-vinylidene chloride copolymer, when dried and then applied to polystyrene film from 90/10 heptane/isobutyl alcohol solution in a third run, gave equally unsatisfactory results as its application in latex form.

The last three runs show that the acrylic resins suggested in U.S. Patent No. 2,829,069 as subcoatings for polyethylene film are not suitable subcoatings for polystyrene film in that their inherent tackiness makes them block severely and precludes their use in an operation where it is desired to wind the subcoated polystyrene film on a roll.

It will be understood that the several embodiments of the invention have been described in the foregoing examples mainly for illustration, but that variations of many kinds may be made therein without departing from the scope of the present invention. For instance, the thickness of the coatings may be adjusted in accordance with procedures and criteria well known in the coating art. Thus the thickness of the anchoring coating affects the strength and durability of the heat seal as well as the durability of the composite film as a whole. The thickness of the top layer, on the other hand, affects the effectiveness of the film as a barrier to water vapor and other gases which one may desire to retain in or to keep out of a package made of the coated polystyrene film or sheet. The package may be either a pliable envelope formed by sealing together two or more edges of a thin coated polystyrene film, or it may be a tray shaped container thermoformed from a coated polystyrene sheet of suitable thickness, using either a thin film or suitable shaped lid as a closure.

The disclosed invention is particularly pointed out in the appended claims.

What is claimed is:

1. A process for making an improved biaxially oriented polystyrene article which comprises coating a biaxially oriented polystyrene film with an aliphatic solvent solution of a normally solid non-tacky resin selected from the group consisting of polymers of an alkyl methacrylate having 1 to 4 carbon atoms per alkyl group and copolymers of mixtures thereof, evaporating solvent from the resulting anchoring coating, and applying to said anchoring coating a solid resinous copolymer of about 80 to 97% of vinylidene chloride and about 3 to 20% of at least one mono-olefinic monomer copolymerizable therewith.

2. A process according to claim 1 wherein said anchoring coating consists essentially of polyisobutyl methacrylate.

3. A process according to claim 1 wherein said aliphatic solvent comprises an alkane of 5 to 8 carbon atoms.

4. A process according to claim 1 wherein the solid resinous copolymer is applied in the form of a latex, and subsequently dried with hot air.

5. An article comprising a base film of biaxially oriented polystyrene having on at least one surface thereof an anchoring coating consisting essentially of a solid resin selected from the group consisting of polymers of alkyl methacrylates having 1 to 4 carbon atoms per alkyl group, and copolymers of mixtures thereof, and a top coating comprising a solid resinous saran copolymer.

6. An article according to claim 5 wherein said top coating comprises a terpolymer of about 90% vinylidene chloride, about 8% ethyl methacrylate, and about 2% acrylonitrile.

7. An article according to claim 5 wherein said top coating comprises a copolymer of about 90% vinylidene chloride and about 10% ethyl acrylate.

8. A tray shaped container formed by thermoforming a sheet comprising a base film of biaxially oriented polystyrene having on at least one surface thereof an anchoring coating consisting essentially of a solid resin selected from the group consisting of polymers of an alkyl methacrylate having 1 to 4 carbon atoms per alkyl group, and copolymers thereof, and a top layer comprising a solid resinous copolymer of about 80 to 97% vinylidene chloride and about 3 to 20% of at least one mono-olefinic monomer copolymerizable therewith.

9. A container according to claim 8 wherein the anchoring coating consists essentially of polyisobutyl methacrylate and the top layer consists essentially of the copolymer of vinylidene chloride and ethyl acrylate.

10. A container according to claim 8 wherein the anchoring coating consists essentially of a solid resin of polyisobutyl methacrylate and the top layer consists essentially of a terpolymer of about 90% vinylidene chloride, about 8% ethyl methacrylate, and about 2% acrylonitrile.

References Cited

UNITED STATES PATENTS

| | | |
|---|---|---|
| 2,578,665 | 12/1951 | Bjorksten et al. ___ 117—138.8 X |
| 2,829,069 | 4/1958 | Michel _____ 117—76 |
| 2,972,534 | 2/1961 | Ben Ezra et al. ___ 117—138.8 X |
| 3,058,846 | 10/1962 | Hahn _____ 117—138.8 |
| 3,128,200 | 4/1964 | Park et al. _____ 117—138.8 X |

WILLIAM D. MARTIN, *Primary Examiner.*

R. HUSACK, *Assistant Examiner.*